United States Patent
Scognamiglio

(10) Patent No.: US 9,757,290 B1
(45) Date of Patent: Sep. 12, 2017

(54) ADJUSTABLE DEVICE FOR ATTACHING A MANUAL WHEELCHAIR TO A SCOOTER

(71) Applicant: Sergio Paolo Scognamiglio, Crystal Beach, FL (US)

(72) Inventor: Sergio Paolo Scognamiglio, Crystal Beach, FL (US)

( * ) Notice: Subject to any disclaimer, the term of this patent is extended or adjusted under 35 U.S.C. 154(b) by 0 days.

(21) Appl. No.: 14/963,917

(22) Filed: Dec. 9, 2015

Related U.S. Application Data

(63) Continuation-in-part of application No. 14/808,635, filed on Jul. 24, 2015, now abandoned.

(51) Int. Cl.
*A61G 5/04* (2013.01)
*A61G 5/10* (2006.01)
*B62K 11/02* (2006.01)
*B62K 3/16* (2006.01)

(52) U.S. Cl.
CPC .............. *A61G 5/047* (2013.01); *A61G 5/10* (2013.01); *B62K 3/16* (2013.01); *B62K 11/02* (2013.01)

(58) Field of Classification Search
CPC ......... A61G 5/047; A61G 5/027; A61G 5/003
See application file for complete search history.

(56) References Cited

U.S. PATENT DOCUMENTS

| | | | |
|---|---|---|---|
| 6,896,079 B1* | 5/2005 | Axelsson | A61G 5/047 180/11 |
| 7,306,250 B1* | 12/2007 | Mills | A61G 5/047 180/11 |
| 7,694,991 B2* | 4/2010 | Mills | A61G 5/1051 180/11 |
| 8,434,775 B2* | 5/2013 | Patmont | A61G 5/026 280/250.1 |
| 2004/0000440 A1* | 1/2004 | Sawyer | A61G 5/047 180/13 |
| 2010/0096204 A1* | 4/2010 | Mosey | A61G 3/0808 180/210 |
| 2015/0351979 A1* | 12/2015 | Conte | A61G 5/047 180/13 |
| 2016/0324703 A1* | 11/2016 | Bach Castillo | A61G 5/10 |

* cited by examiner

*Primary Examiner* — Kevin Hurley

(57) ABSTRACT

An adjustable coupling device for use with a conventional wheelchair and a conventional vehicle. The wheelchair has a transverse foot support with a length. The vehicle has a support deck with a width. The coupling device is removably secured to the support deck. The coupling device is formed with a rectangular base plate. Upstanding components extending upwardly from the base plate are configured to receive and retain the transverse foot support. The width of the base plate is less than the length of the transverse foot support. The base plate has two spaced holes laterally spaced by a distance greater than the width of the support deck. A mechanism has a central section beneath the support deck and has upstanding ends extendable upwardly through the holes in the base plate. The mechanism is adapted to hold the base plate to the support deck.

4 Claims, 23 Drawing Sheets

ADJUSTABLE DEVICE FOR ATTACHING A MANUAL WHEELCHAIR TO A SCOOTER

RELATED APPLICATION

The present patent application is a continuation-in-part of pending patent application Ser. No. 14/808,635 filed Jul. 24, 2015, the subject matter of which patent application is incorporated herein by reference.

BACKGROUND OF THE INVENTION

Field of the Invention

The present application relates to a device that attaches a manually propelled wheelchair to a powered scooter. It is simply an interface or connection between a manual wheelchair and a commercially available scooter. The device couples a non-motorized wheelchair to a motorized scooter for creating a motorized wheelchair. The coupling and creating is done in a safe, convenient, and economical manner.

Description of the Prior Art

The use of wheelchair and scooter systems of known designs and configurations is known in the prior art. More specifically, wheelchair and scooter systems of known designs and configurations previously devised and utilized for the purpose of powering wheelchairs are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,306,250 B1 to Mills discloses a method of attaching a manually operated wheelchair to a motorized scooter. This patent attaches a manually operated wheelchair to a motorized scooter utilizing an adjustable telescoping bar mounted to the underside of the wheelchair.

U.S. Pat. No. 7,694,991 B2 to Mills and Mills discloses a motorized scooter wheelchair attachment device. This patent is for a motorized scooter wheelchair attachment device. Similar to the U.S. Pat. No. 7,306,250 B1, but it requires hardware to be attached to the wheelchair, namely a U-shaped 'angle iron attachment adjustable bar' fastened to the underside of the wheelchair.

U.S. Patent Application No. 20040000440 A1 to Sawyer discloses an attachment means for attaching a wheelchair to a motorized apparatus. This published application includes the motorized device and wheel that attaches to the wheelchair. The wheelchair is secured to the device via "a clamping means to engage the lower portion of the front tires, rim and spokes of the front wheels of a conventional manually operated wheelchair."

U.S. Patent Application No. 20100237586 A1 to Dougherty discloses an all terrain adapter for a wheelchair. This patent is for a device that includes a swiveling wheel that mounts to the foot support. The device, being somewhat difficult to attach to the wheelchair, extends the wheelbase of the chair, thereby improving the handling over rough terrain U.S. Pat. No. 6,860,347 B2 to Daka Research, Inc. discloses a wheelchair drive unit. This patent is for a device that includes a wheel, an electric motor, a battery and struts used to mount the device onto the rear of the wheelchair.

U.S. Pat. No. 7,216,728 B2 to Huang, Lin, Konno, Ochiai, Tsuda and Wang discloses a motorized apparatus for towing a wheelchair. This patent is for a motorized apparatus for towing a wheelchair.

While these devices fulfill their respective, particular objectives and requirements, the aforementioned patents do not describe an adjustable device for attaching a manual wheelchair to a scooter that couples a non-motorized wheelchair to a motorized scooter for creating a motorized wheelchair. The coupling and creating is done in a safe, convenient, and economical manner.

In this respect, the adjustable device for attaching a manual wheelchair to a scooter according to the present invention substantially departs from the conventional concepts and designs of the prior art, and in doing so provides an apparatus primarily developed for the purpose of coupling a non-motorized wheelchair to a motorized scooter for creating a motorized wheelchair. The coupling and creating is done in a safe, convenient, and economical manner.

Therefore, it can be appreciated that there exists a continuing need for a new and improved adjustable device for attaching a manual wheelchair to a scooter which can be used for couples a non-motorized wheelchair to a motorized scooter for creating a motorized wheelchair. The coupling and creating is done in a safe, convenient, and economical manner. In this regard, the present invention substantially fulfills this need.

SUMMARY OF THE INVENTION

In view of the foregoing disadvantages inherent in the known types of wheelchair and scooter systems of known designs and configurations now present in the prior art, the present invention provides an improved adjustable device for attaching a manual wheelchair to a scooter. As such, the general purpose of the present invention, which will be described subsequently in greater detail, is to provide a new and improved adjustable device for attaching a manual wheelchair to a scooter and method which has all the advantages of the prior art and none of the disadvantages.

To attain this, the present invention essentially comprises an adjustable coupling device for use with a conventional wheelchair and a conventional powered vehicle. A wheelchair has a transverse foot support with a length. A powered vehicle has a support deck with a width. A coupling device is removably secured to the support deck. The coupling device is formed with a base plate in a rectangular configuration. Upstanding components extending upwardly from the base plate are configured to receive and retain the transverse foot support. The width of the base plate is less than the length of the transverse foot support. The base plate has two spaced holes laterally spaced by a distance greater than the width of the support deck. A mechanism has a central section beneath the support deck and has upstanding ends extending upwardly through the holes in the base plate. The mechanism is adapted to hold the base plate to the support deck.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable coupling device for attaching a manual wheelchair to a scooter which has all of the advantages of the prior art wheelchair and scooter systems of known designs and configurations and none of the disadvantages.

It is another object of the present invention to provide a new and improved adjustable device for attaching a manual wheelchair to a scooter which may be easily and efficiently manufactured and marketed.

It is further object of the present invention to provide a new and improved adjustable device for attaching a manual wheelchair to a scooter which is of durable and reliable constructions.

An even further object of the present invention is to provide a new and improved adjustable device for attaching a manual wheelchair to a scooter which is susceptible of a low cost of manufacture with regard to both materials and labor, and which accordingly is then susceptible of low prices of sale to the consuming public, thereby making such adjustable device for attaching a manual wheelchair to a scooter economically available to the buying public.

Lastly, another object of the present invention is to provide an adjustable device for attaching a manual wheelchair to a scooter to couple a non-motorized wheelchair to a motorized scooter to create a motorized wheelchair. The coupling and creating is done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a plan view of the device installed on scooter with a wheelchair foot support bar locked in.

FIG. 5 is a perspective view of the device with a wheelchair foot support locked in.

FIG. 8 is a side elevational view of the device with sidewalls 61 and a lower portion of the wheelchair locked in.

FIG. 9 is a plan view of the device with sidewalls and a lower portion of the wheelchair locked in.

The same reference numerals refer to the same parts throughout the various Figures.

DESCRIPTION OF THE PREFERRED EMBODIMENT

Figure 1:
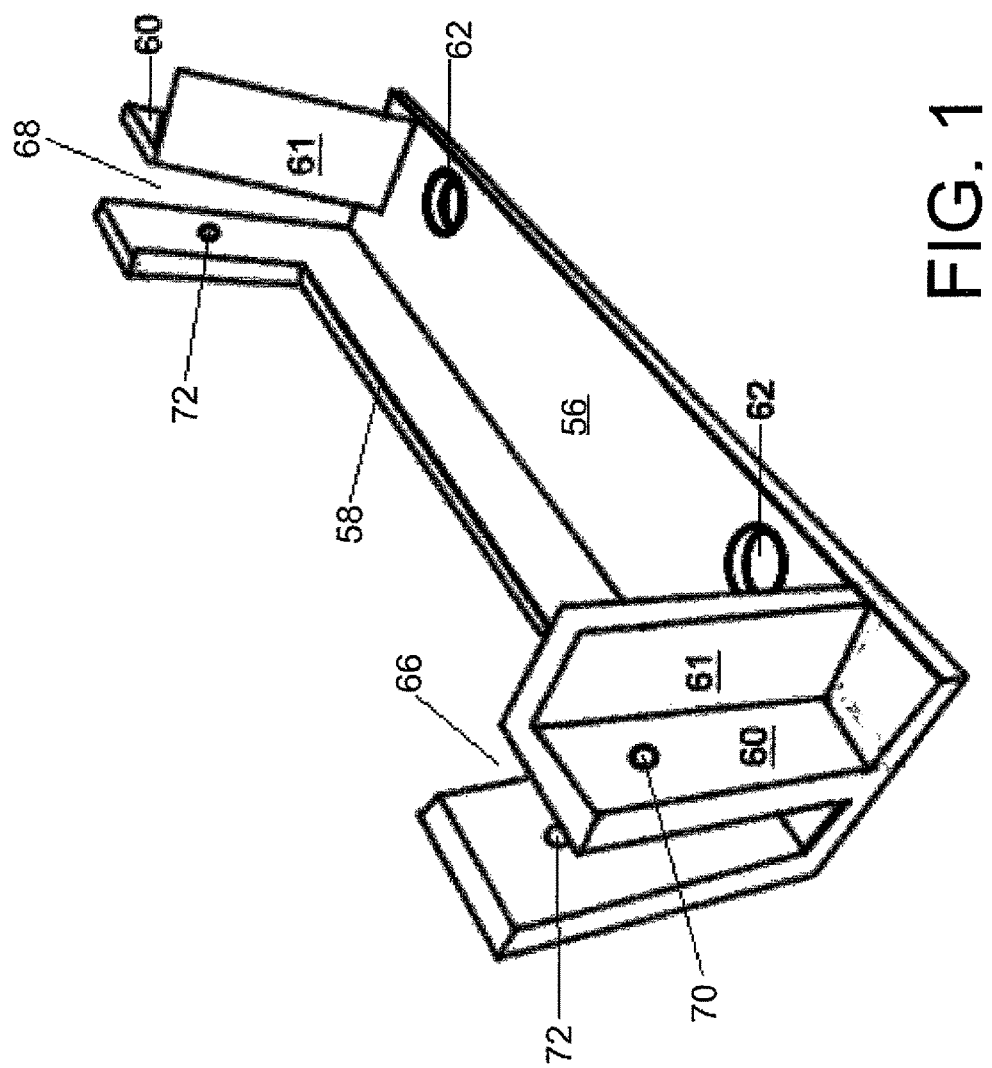
FIG. 1 is a perspective illustration of an adjustable device for attaching a manual wheelchair to a motorized scooter, fabrication including welding.

With reference now to the drawings, and in particular to FIG. 1 thereof, the preferred embodiment of the new and improved adjustable device for attaching a manual wheelchair to a scooter embodying the principles and concepts of the present invention and generally designated by the reference numeral 100 will be described.

The present invention, a wheelchair/scooter system 100 is comprised of a plurality of components. Such components in their broadest context include neither the wheelchair nor the scooter or motorized vehicle and does not include any wheels, batteries, motors, or brakes. Provided are a base plate for receiving and retaining the transverse foot support of a wheelchair and a mechanism to hold the base plate to the support deck of a powered vehicle. Such components are individually configured and correlated with respect to each other so as to attain the desired objective. The invention includes a method of use of the wheelchair/scooter system is included.

The wheelchair/scooter system 100 is for operatively coupling a non-motorized wheelchair 12 to a motorized scooter 14 for creating a motorized wheelchair. The coupling and the creating are done in a safe, convenient, and economical manner, First provided is the non-motorized wheelchair 12. The wheelchair has a seat 18 for the user. The wheelchair has a frame 20 with a central section supporting the seat. The frame has a rear section with push handles 22 elevationally above the seat. The frame has a forward section with a horizontal foot support 24. A transverse foot support 26 is provided elevationally below the seat. The transverse foot support has a first diameter and a first length. The wheelchair has two laterally spaced large wheels 28 spanning the seat. The wheelchair has two laterally spaced small caster wheels 30 spanning foot support.

Next provided is the motorized scooter 14. A wide variety of motorized vehicles in addition to scooters may be utilized, for example, a two-wheeled self-balancing electric scooter or a three-wheel scooter 86. The scooter has a support deck with a length and a width in a horizontal plane. The support deck has an upper surface 34, a lower surface 36, a forward end 38, and a rearward end 40. The scooter has a vertical tube 42 with a lower end rotationally journaled in the forward end of the support deck. The vertical tube has steering handles 44 elevationally above the support deck. The vertical tube has a forward wheel 46 elevationally below the support deck. One rearward wheel 48 is coupled to the rearward end of the support deck elevationally below the support deck. A motor 50 is coupled to the rearward wheels for powering and driving the scooter.

Lastly, a coupling device 54 is removably secured to the upper surface of the support deck adjacent to the forward end. The coupling device is formed with a base plate 56 in a rectangular configuration, an upstanding forward plate 58, two upstanding rearward plates 60, and two sidewalls 61. The base plate has a width greater than the width of the support deck. The base plate has a width less than the length of the wheelchair foot support transverse bar. The base plate has two laterally spaced holes 62 laterally spaced by a distance greater than the width of the support deck. The front plate extends transversely across the entire width of the support deck. The two upstanding rearward plates are laterally spaced outwardly of the two laterally spaced holes. The spaces between the rearward plates and the forward plate constitute a left channel and a right channel 66, 68. Two pairs of axially aligned apertures 70, 72 extend through each of the rearward plates and the forward plate. The two pairs of axially aligned apertures are in a horizontal plane spaced above the base plate by a distance greater than the diameter of the wheelchair foot support transverse bar. Removable lock pins 74 are provided through each pair of axially aligned apertures. A U-bolt 76 is provided. The U-bolt has a central section 78 beneath the support deck. The U-bolt has upstanding threaded ends 80 extending upwardly through the laterally spaced holes in the base plate. A nut 82 is threadedly coupled to each threaded end of the U-bolt to hold the base plate to the support deck.

Figure 21:
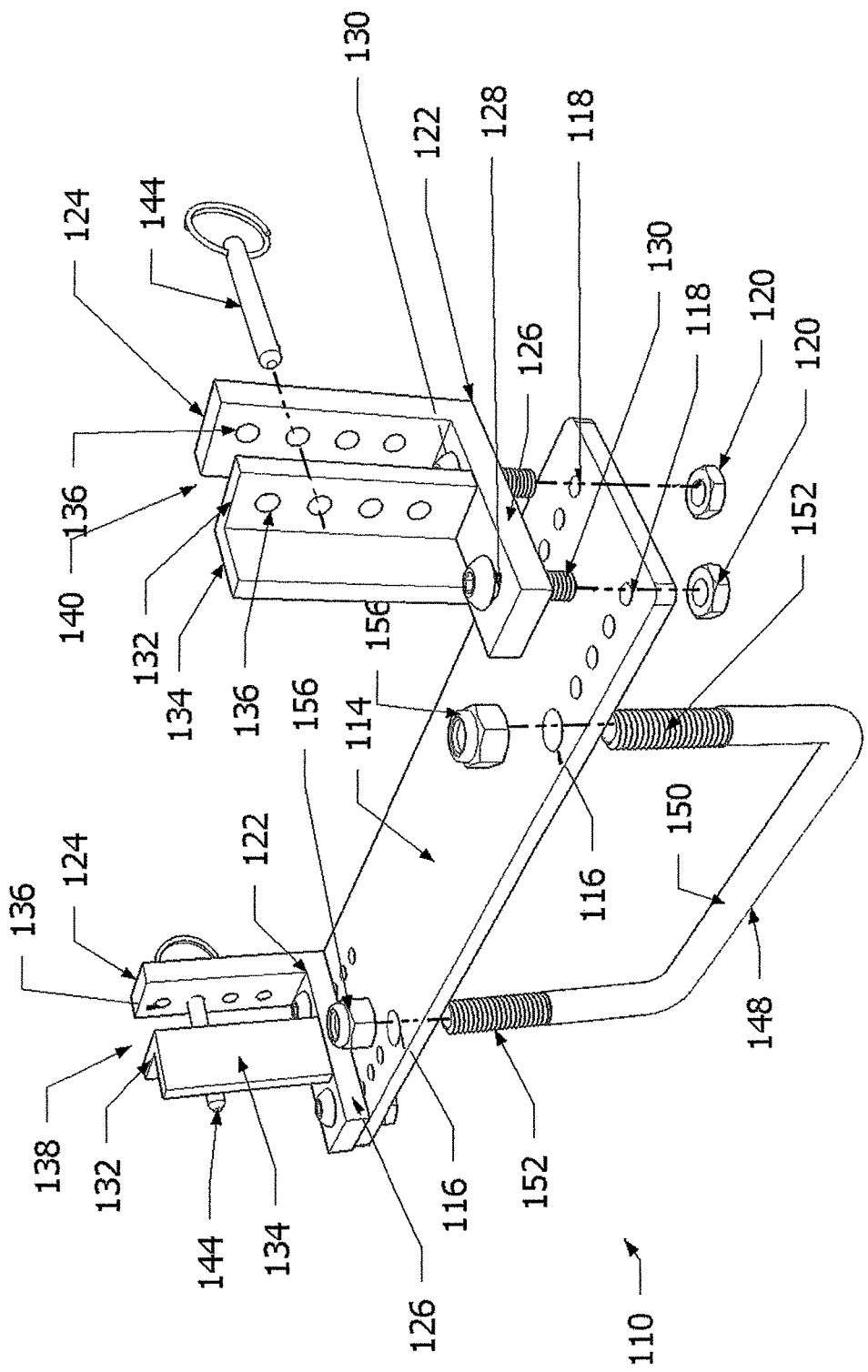
FIG. 21 is an exploded perspective illustration of an alternate embodiment of the invention to facilitate usage with any type or size of wheelchair.
Figure 23:
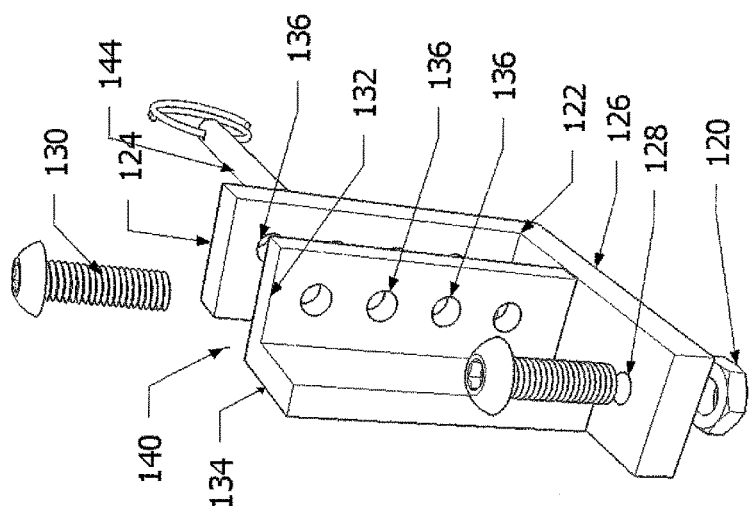
FIG. 23 is another enlarged perspective illustration of the upstanding components of FIG. 21 but with the base plate removed.
Figure 22:
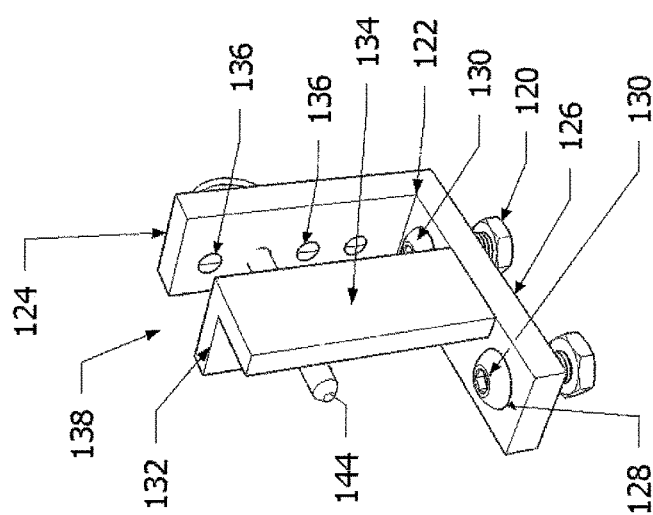
FIG. 22 is an enlarged perspective illustration of the upstanding components of FIG. 21 but with the base plate removed.
Figure 24:
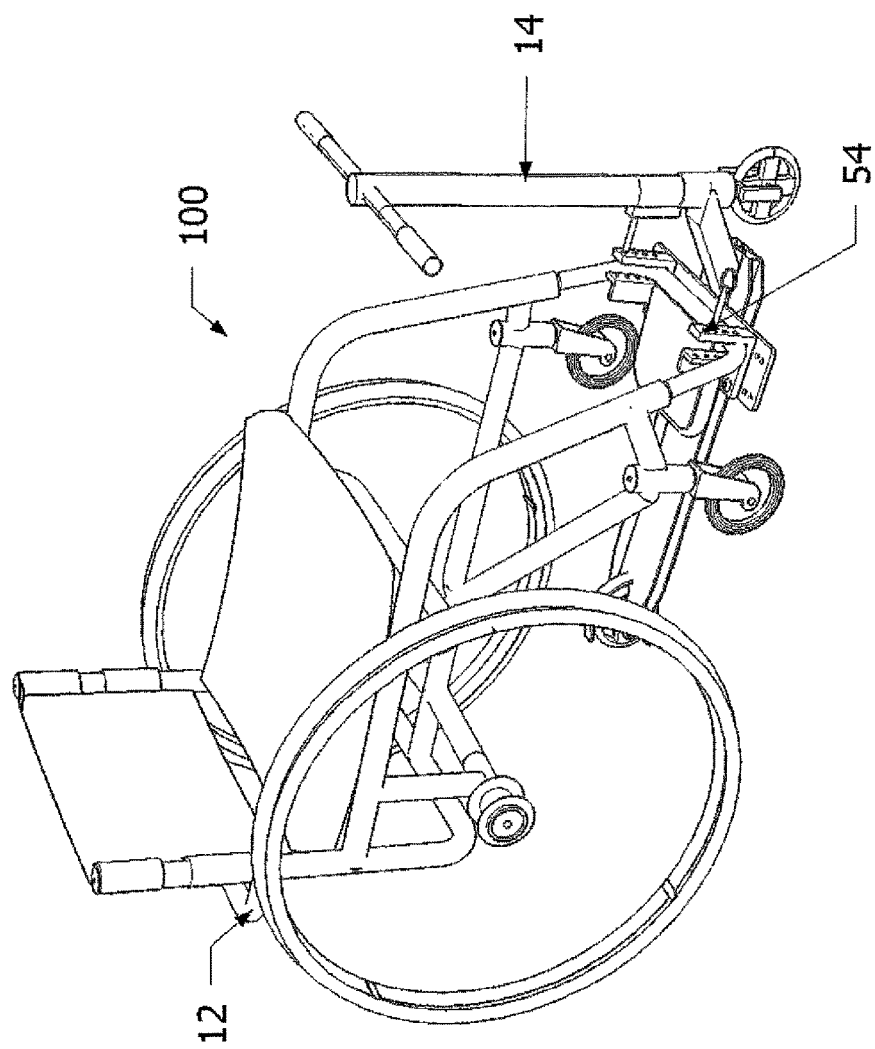
FIG. 24 is a perspective showing of the entire system constructed in accordance with the alternate embodiment of the invention.

The present invention is directed to a device similar to the device described and claimed in my above referred-to prior patent application of which this application is a continuation-in-part. The present device accomplishes the same function as the prior device, namely, coupling a manually propelled wheelchair to a scooter. The improvement is the additional feature of being width adjustable. The prior device requires a unit to be fabricated to correspond to the width of a specific wheelchair foot support. Note FIGS. 21 and 22. The prior device unit could only fit a wheelchair of a size for which the device was made.

The present invention is an improved embodiment which has the ability to adjust to a width corresponding to the width of the specific wheelchair foot support. The present invention eliminates the need for a custom made device.

The present embodiment is a "one size fits all" device, a bracket that enables any manual wheelchair to easily attach to a scooter.

The updated embodiment contains all of the components of the original embodiment but with an improved base plate. From a broad point of view, the invention is a bracket system for coupling any non-motorized wheelchair to a scooter. A base plate has two spaced larger holes and pairs of spaced smaller holes. Two L-shaped components are composed of an upstanding vertical plate and a lower horizontal plate. A pair of vertical apertures extend through each lower plate. Two upstanding rearward plates are attached to an associated lower plate. Pairs of axially aligned, elevationally spaced horizontal apertures extend through an associated vertical plate and rearward plate. Two spaces are formed between the rearward plates and the vertical plates constituting a left and right channel. Lock pins extend through associated pairs of horizontal apertures of the upper and rearward plates. A U-bolt has a central section and upstanding threaded ends extending upwardly through the larger holes in the base plate. Lastly, a nut is threadedly coupled to each threaded end.

From a specific point of view, the invention is a wheelchair/scooter system including a bracket 110 for operatively coupling any non-motorized wheelchair 12 to a scooter 14, a motorized scooter in the preferred embodiment, for creating a motorized wheelchair. The coupling and the creating are done in a safe, convenient, and economical manner, the system comprises, in combination, a base plate 114 configured in a rectangular configuration and positioned in a horizontal plane. The base plate has two laterally spaced larger holes 116. The laterally spaced larger holes are spaced by a distance greater than a width of a support deck of a motorized scooter to which the bracket is to be coupled. The base plate extends transversely across and beyond an entire width of the support deck. The base plate is formed with a plurality of pairs of spaced smaller holes 118.

Two L-shaped components 122 are next provided. Each L-shaped component is composed of an upstanding vertical plate 124 and a horizontal lower plate 126. A pair of latitudinally spaced vertical apertures 128 extend through each lower plate. A bolt 130 extends through the vertical apertures in the lower plate and the smaller holes of the base plate with a nut 120 securing each bolt in place. Two upstanding rearward plates 132 are also provided. Each upstanding rearward plate is attached to an intermediate extent of an associated lower plate. Two sidewalls 134 are also provided. Each side wall has edges attached to an associated rearward plate and an associated lower plate. The sidewalls are vertically disposed in facing relationship with each other. A plurality of pairs of axially aligned, elevationally spaced horizontal apertures are provided. Each pair of axially aligned horizontal apertures extend through an associated vertical plate and an associated rearward plate.

Two spaces are formed between the rearward plates and the vertical plate constituting a left channel 138 and a right channel 140. The pairs of axially aligned horizontal apertures are in a horizontal plane spaced above the base plate by a distance greater than a diameter of a wheelchair foot support transverse bar of a wheelchair to be coupled to the bracket.

Removable lock pins 144 extend through associated pairs of axially aligned horizontal apertures of the vertical plates and the rearward plates.

A U-bolt 148 has a central section 150 beneath the support deck. The U-bolt has upstanding threaded ends 152 extending upwardly through the laterally spaced holes in the base plate.

Lastly, nuts 156 are threadedly coupled to each threaded end of the U-bolt to hold the base plate to the support deck.

The present invention includes a wheelchair/scooter method for operatively coupling a non-motorized wheelchair to a motorized scooter for creating a motorized vehicle. The coupling and the creating are done in a safe, convenient, and economical manner. The method comprises steps in combination.

The first step is providing the wheelchair having a foot support and a transverse The device as set forth in claim 1 and further including the wheelchair with a horizontal support, and further including the motorized vehicle with the support deck with a length, a motorized scooter having a support deck with a width, a coupling device removably secured to the support deck and formed with a base plate in a rectangular configuration, components extending upwardly from the base plate configured to receive and retain the transverse foot support, the base plate having a width less than the length of the transverse foot support, the base plate having two spaced holes laterally spaced by a distance greater than the width of the support deck, a U-bolt having a central section beneath the support deck and having upstanding threaded ends extending upwardly through the holes in the base plate, a nut threadedly coupled to each threaded end of the U-bolt to hold the base plate to the support deck.

The next step is positioning the wheelchair behind the motorized scooter facing the rear of the scooter.

The next step is 'popping a wheelie' with the wheelchair.

The next step is moving forward with the wheelchair in a wheelie position until the foot support is approximately lined up over the coupling device.

The next step is dropping the wheelchair foot support into the coupling device.

The next step is sliding the pins over the foot support in the channel to created a powered wheelchair/scooter.

Figure 2:
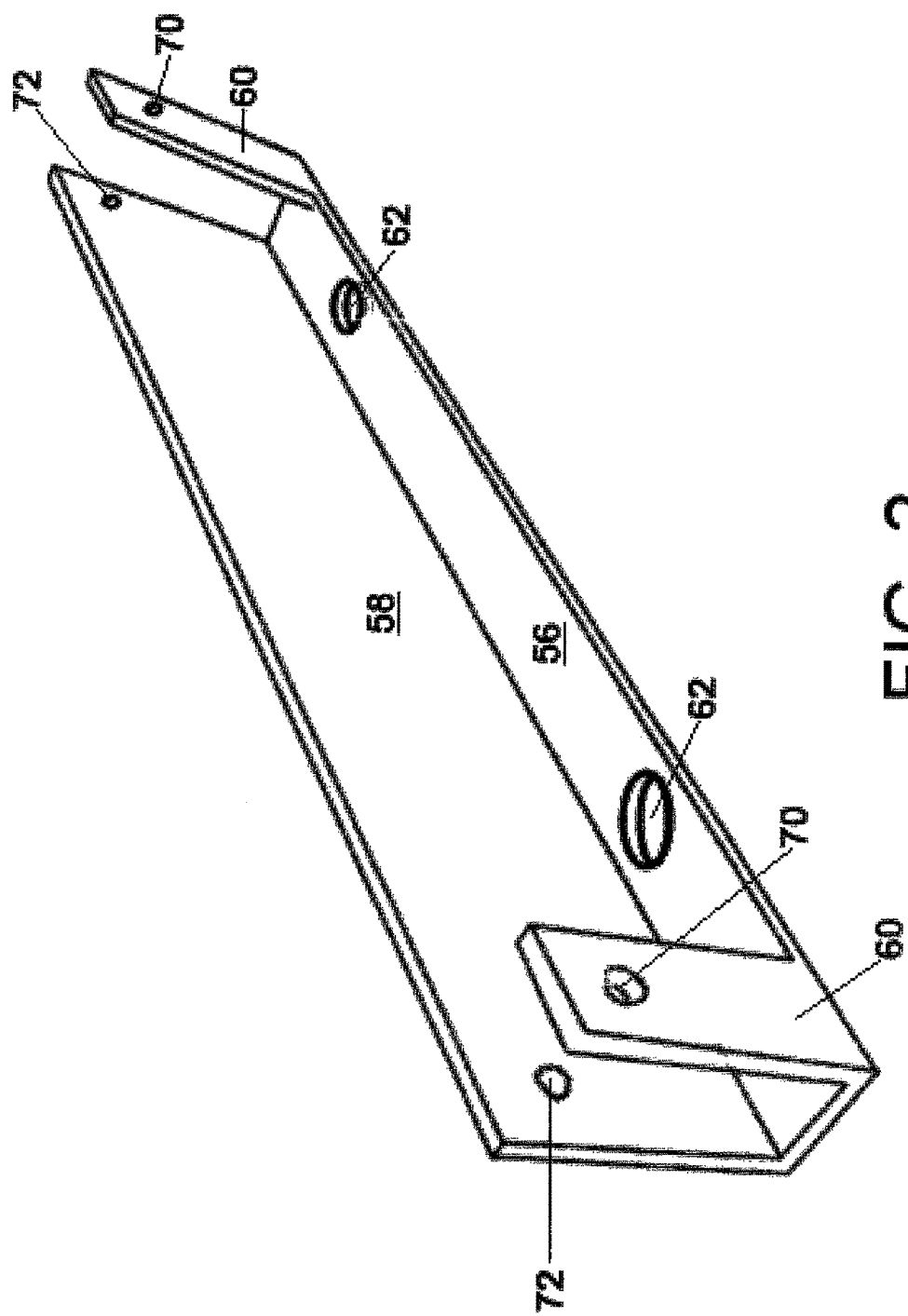
FIG. 2 is a perspective illustration of an adjustable device for attaching a manual wheelchair to a motorized scooter, fabrication including bending.
Figure 3:
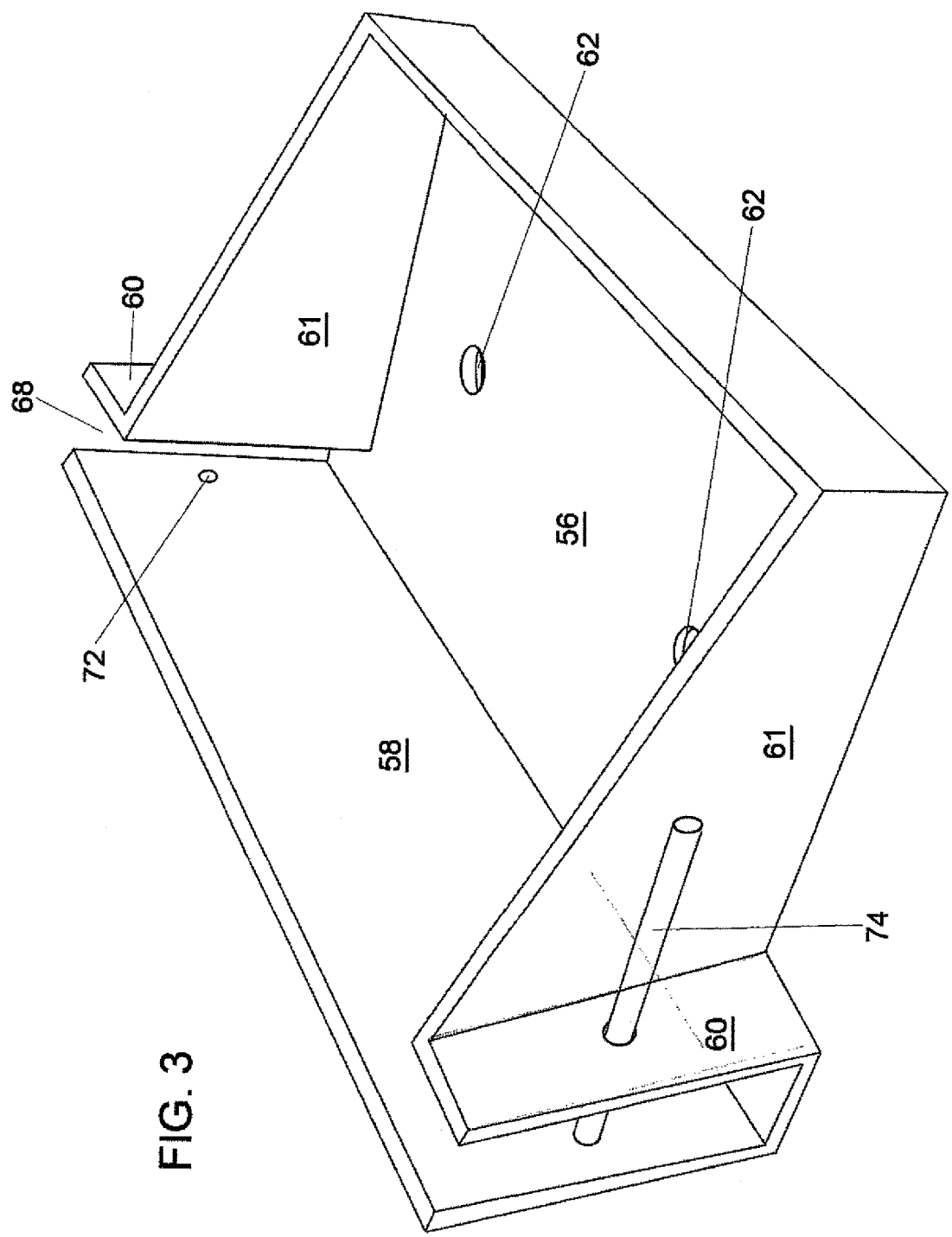
FIG. 3 is a perspective illustration of an alternate embodiment of the adjustable device for attaching a manual wheelchair to a motorized scooter, the device having large sidewalls.
Figure 4:
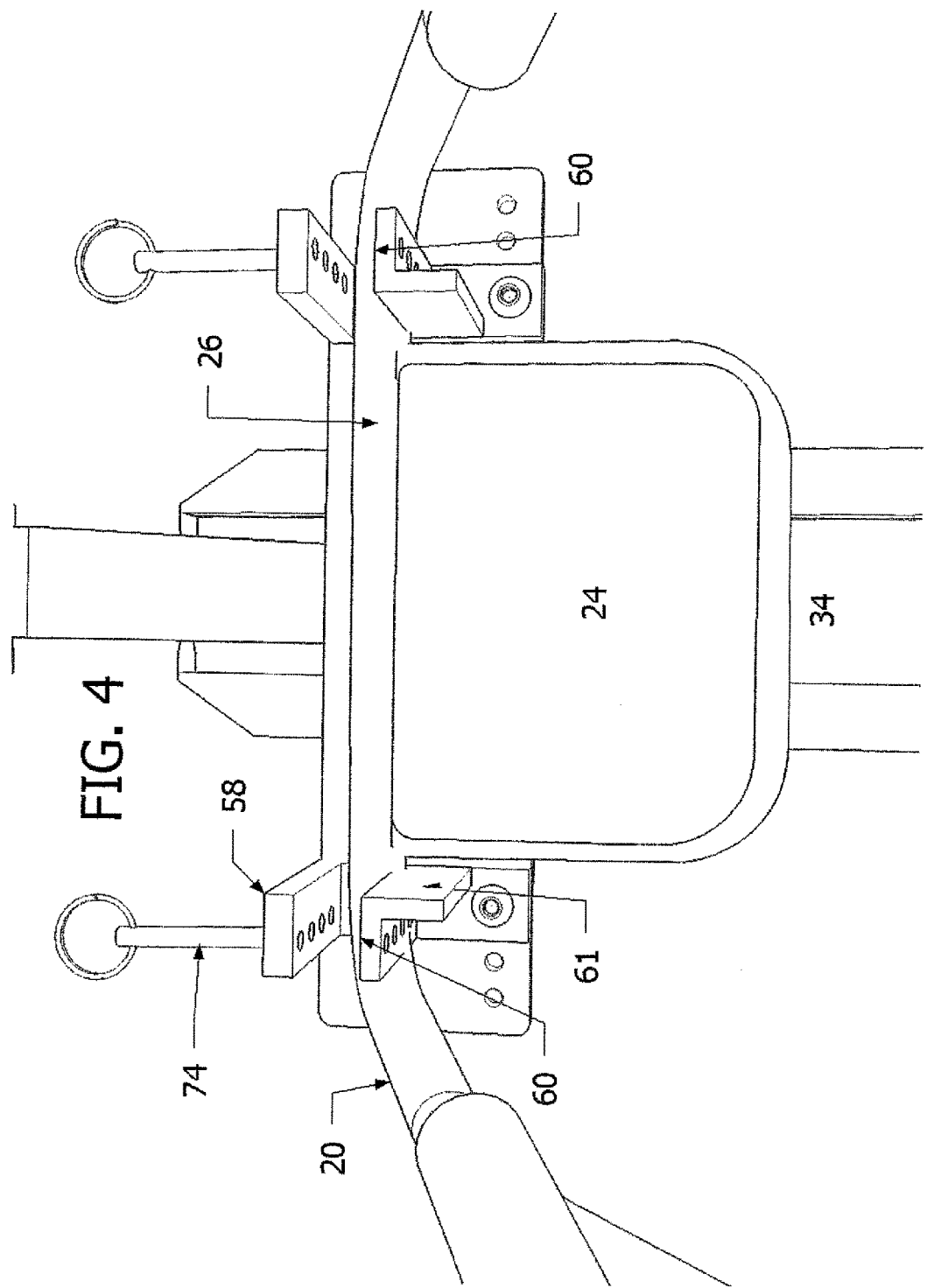

The present application relates to a device that attaches a manually propelled wheelchair to a scooter. It is simply an interface or connection between a manual wheelchair and a commercially available scooter. In its broadest terms, it includes neither the wheelchair, nor the scooter, and does not include any wheels, batteries, motors or brakes. (Note FIGS. 1 and 2). The device is adapted to be used with a motorized scooter or another self propelled vehicle. In addition to securely connecting the manual wheelchair to the scooter, the device also ensures that the wheelchair is lined up squarely on the scooter and in the proper position, laterally centered. The device requires no hardware mounted onto the wheelchair. The securing of the wheelchair to the scooter is intended to be accomplished easily and quickly by disabled individuals with limited movement and hand dexterity.

Figure 17:
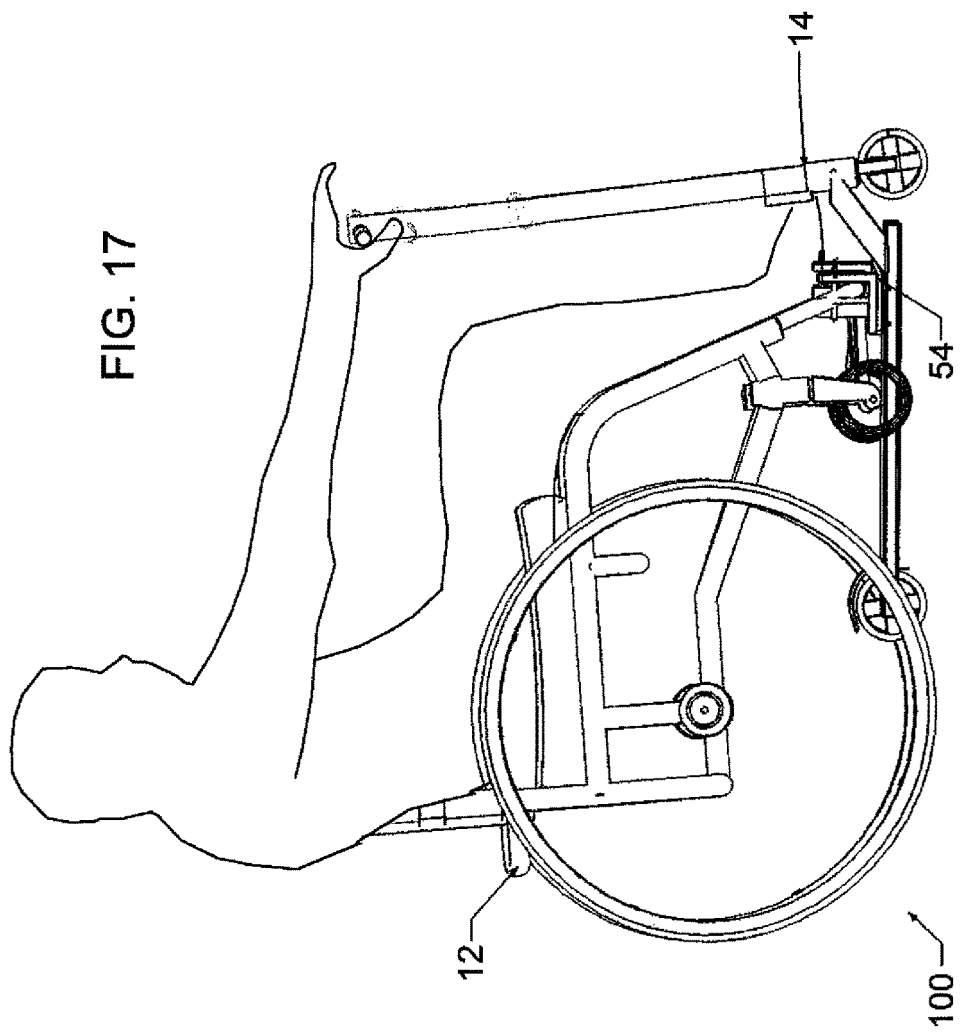
FIG. 17 is a perspective illustration of the foot support of the wheelchair in a locked position on the scooter.
Figure 18:
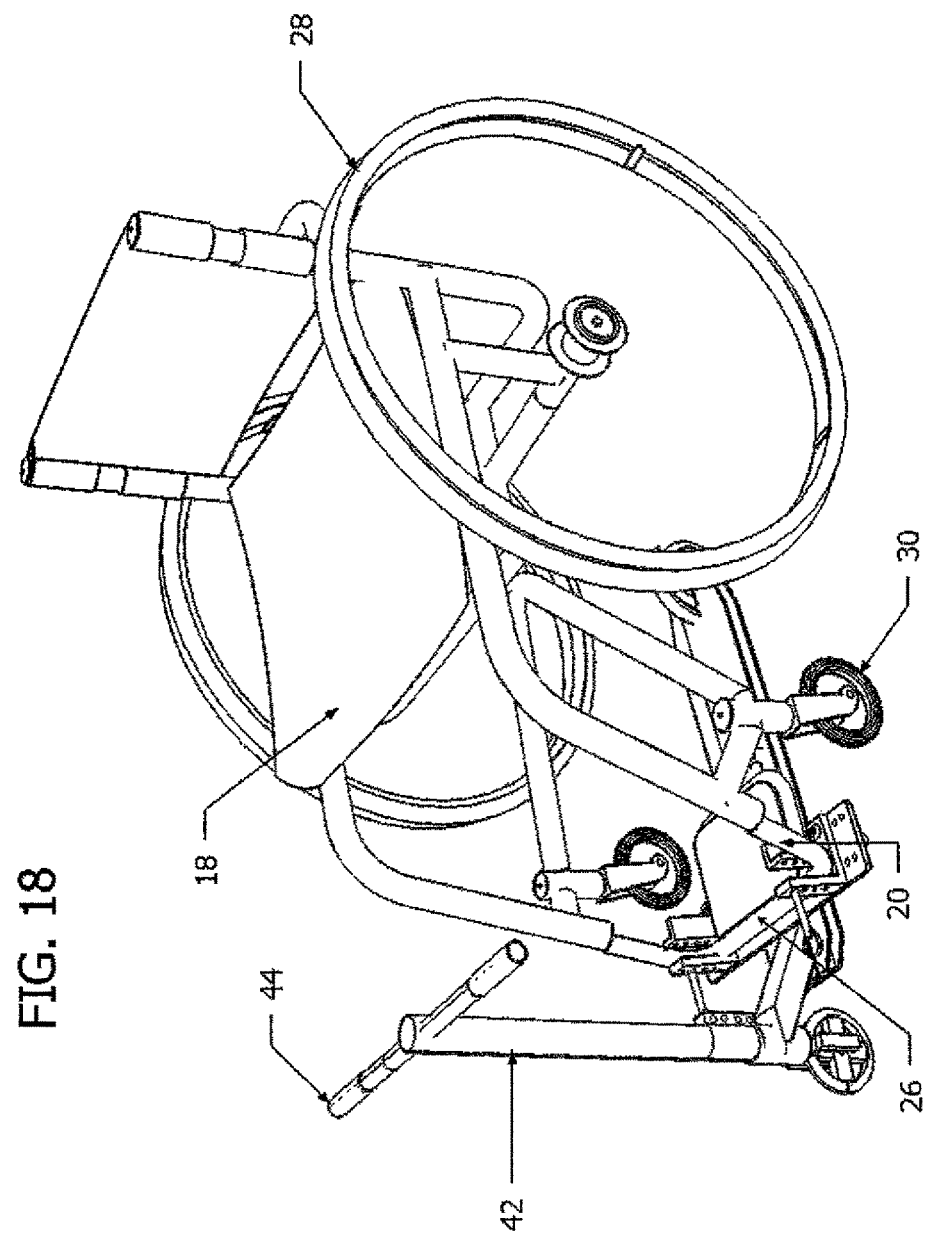
FIG. 18 is a perspective illustration of the device attached to the scooter with a wheelchair coupled.
Figure 19:
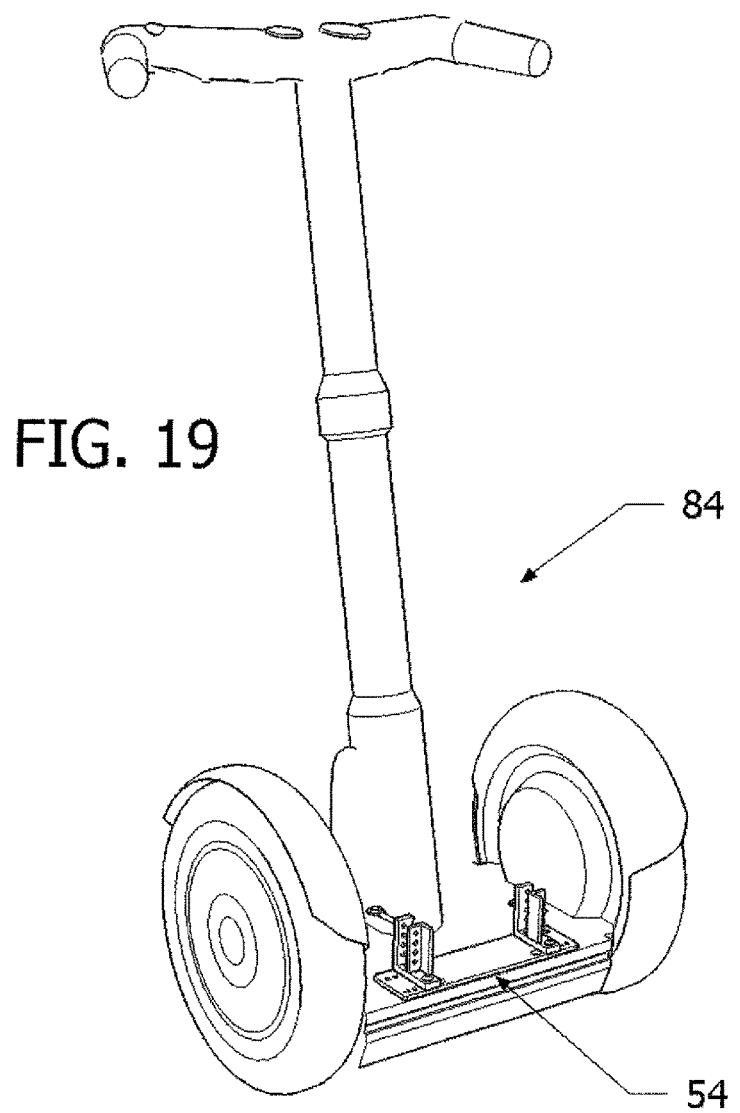
FIG. 19 is a perspective illustration of the device attached to a self balancing two-wheeled scooter 84.
Figure 20:
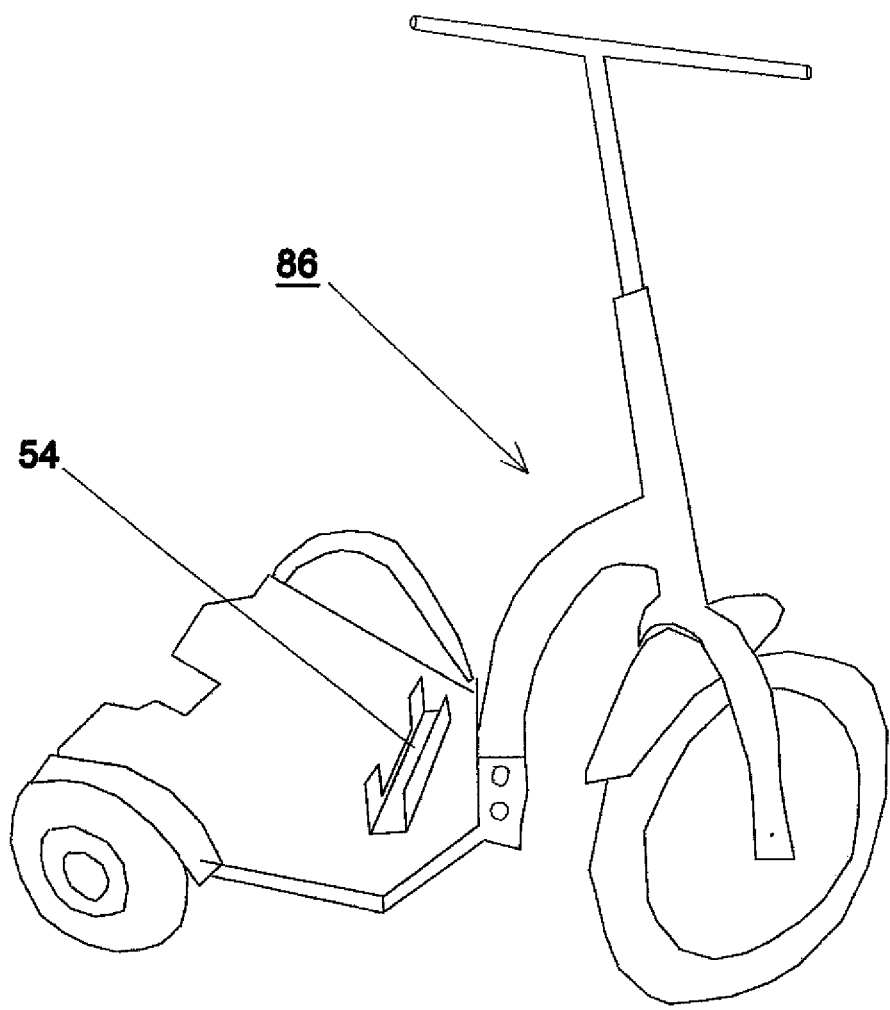
FIG. 20 is a perspective illustration of the device attached to a three-wheeled scooter 86.

After the wheelchair is securely attached to the scooter, the disabled individual can enjoy the recreational activity of scooter riding. The user remains seated in his wheelchair, with the rear wheels of the wheelchair making contact with the ground and front wheels of the wheelchair, casters, elevated off the ground (FIG. 17). When using the device to connect to a self propelled scooter, the user provides the motion by pushing the wheelchair wheels. When using the device to attach to a motorized scooter, the user is able to propel, steer and brake his wheelchair utilizing the motor, steering and brakes of the motorized scooter.

An estimated 1.6 million individuals in the United States alone utilize wheelchairs. These individuals live with some form of paralysis, due to illness or injury. Paralyzed individuals are often limited in the sports or activities in which they can participate. Formerly active individuals, who have experienced blunt force traumatic injuries that damage their spinal cords, are often left with few options for physical activities or recreation. Besides being faced with the day-to-day challenges of paralysis itself, the individual can no longer participate in a sport or recreational activity that they enjoy.

Innovations and adaptations have greatly improved the opportunities available for disabled individuals to participate in sports or recreational activities.

Examples of sports or activities that were previously 'off limits' to disabled individuals but are now routinely enjoyed by these individuals include sailing, cycling, rugby, bowling, and kayaking. The device of the present invention opens up the activity of riding a scooter to wheelchair users.

Figure 7:
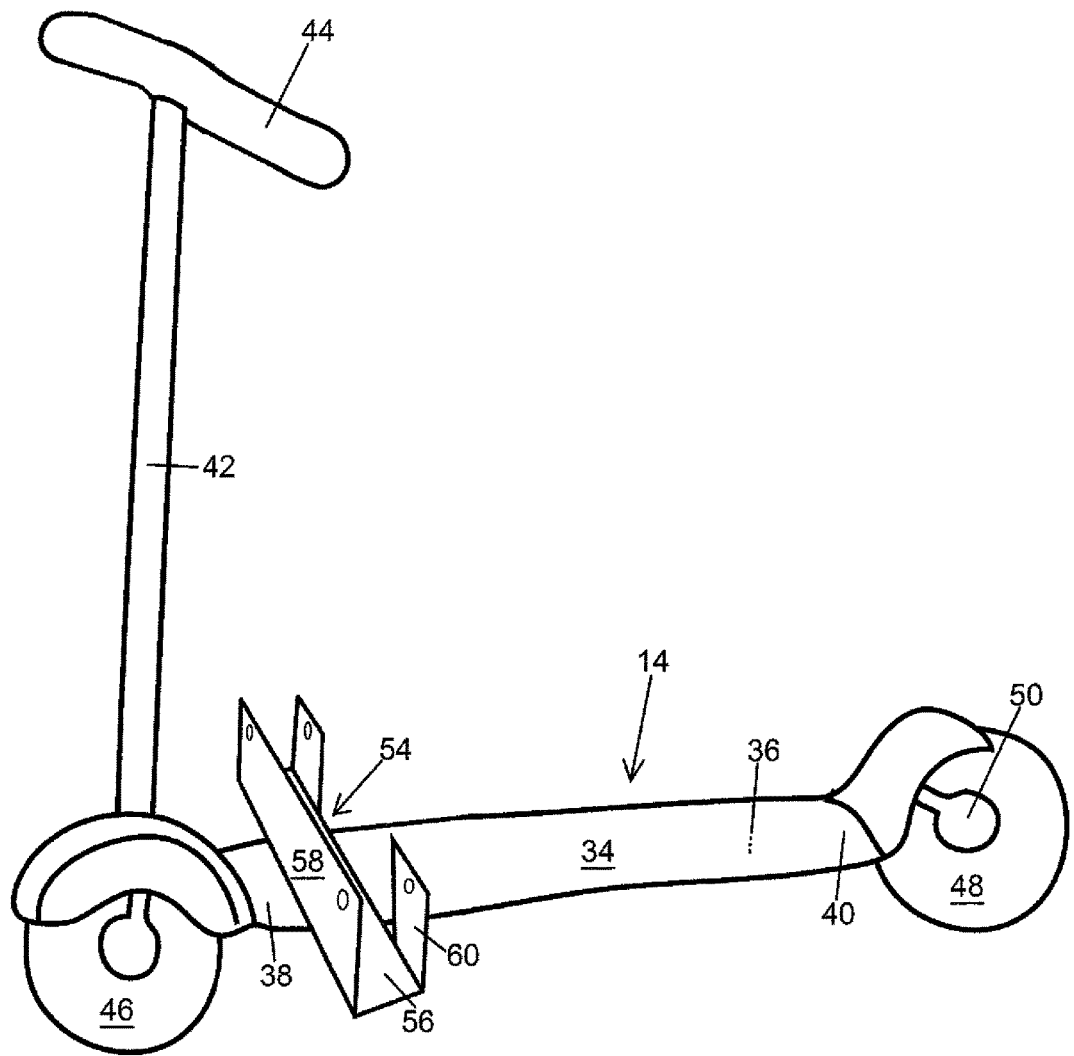
FIG. 7 is a side elevational view of the device installed on a scooter.
Figure 8:
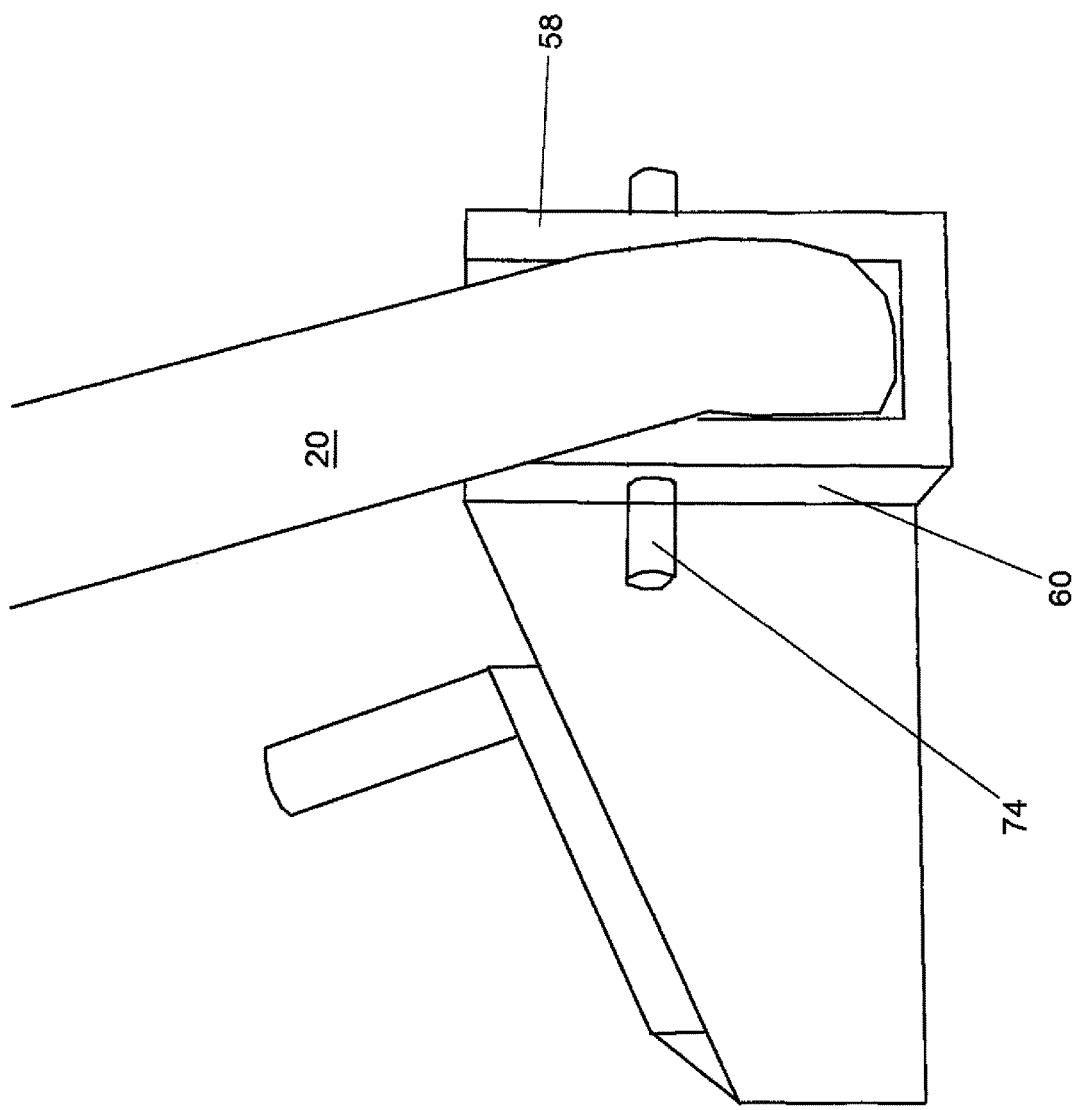
Figure 9:
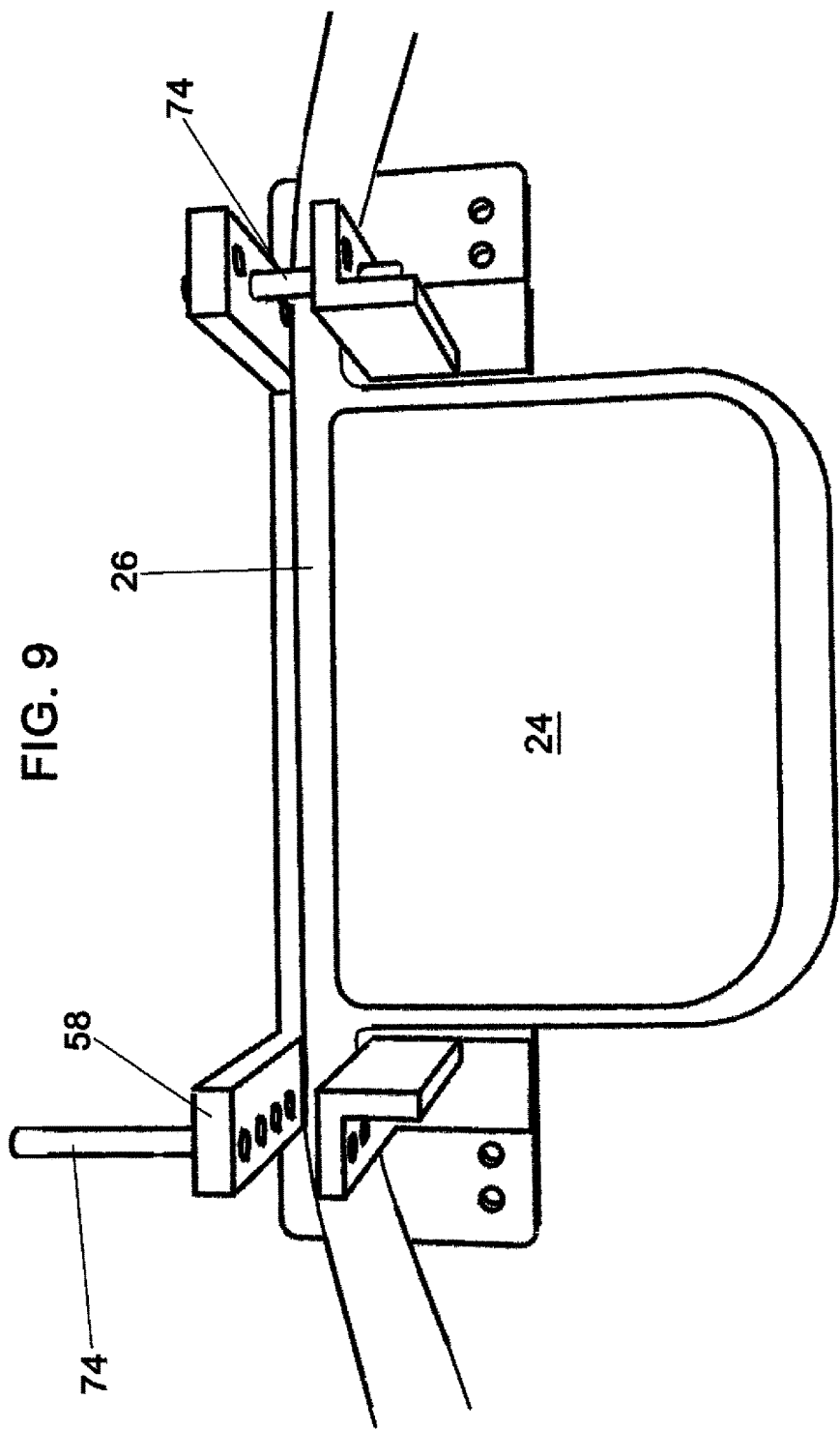

The present invention is a device that is installed onto a scooter (FIG. 7). With the device installed on the scooter, a wheelchair user can easily attach his/her wheelchair to the Scooter. When the wheelchair is attached to the scooter, the wheelchair casters become elevated off the ground and wheelchair rear wheels remain resting on the ground. Once locked in, the wheelchair user can ride the scooter while in his/her wheelchair (FIG. 17). Detaching the wheelchair from the scooter is accomplished just as easily.

Figure 10:
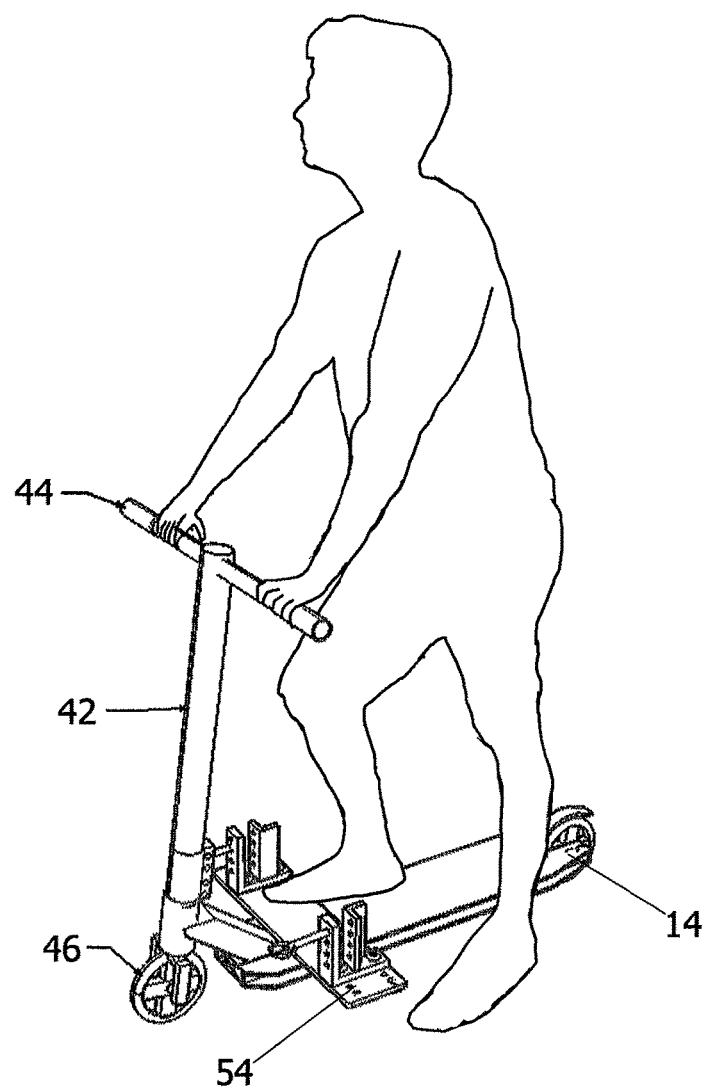
FIG. 10 is a perspective illustration of an able-bodied rider using a scooter with the device installed.
Figure 11:
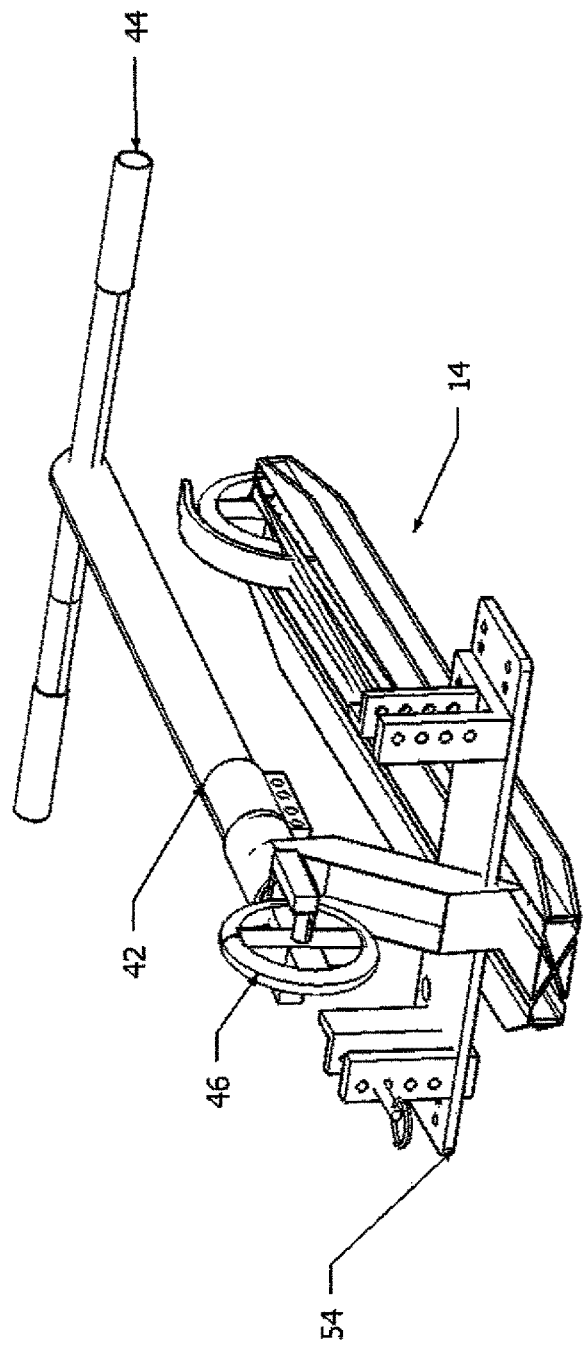
FIG. 11 is a perspective illustration of a scooter with the device installed, the scooter being in a folded position.

The scooter, with the device installed on it, can be ridden in the normal fashion by an able-bodied individual when the wheelchair is not locked onto it (FIG. 10). In other words, the device does not hinder an able-bodied individual from riding the scooter in the normal fashion, standing on the deck of the scooter. In addition, having the device installed on the scooter does not hinder the scooter stem from being folded down for compact storage and transportability, as most scooters have the ability to do (FIG. 11).

Figure 12:
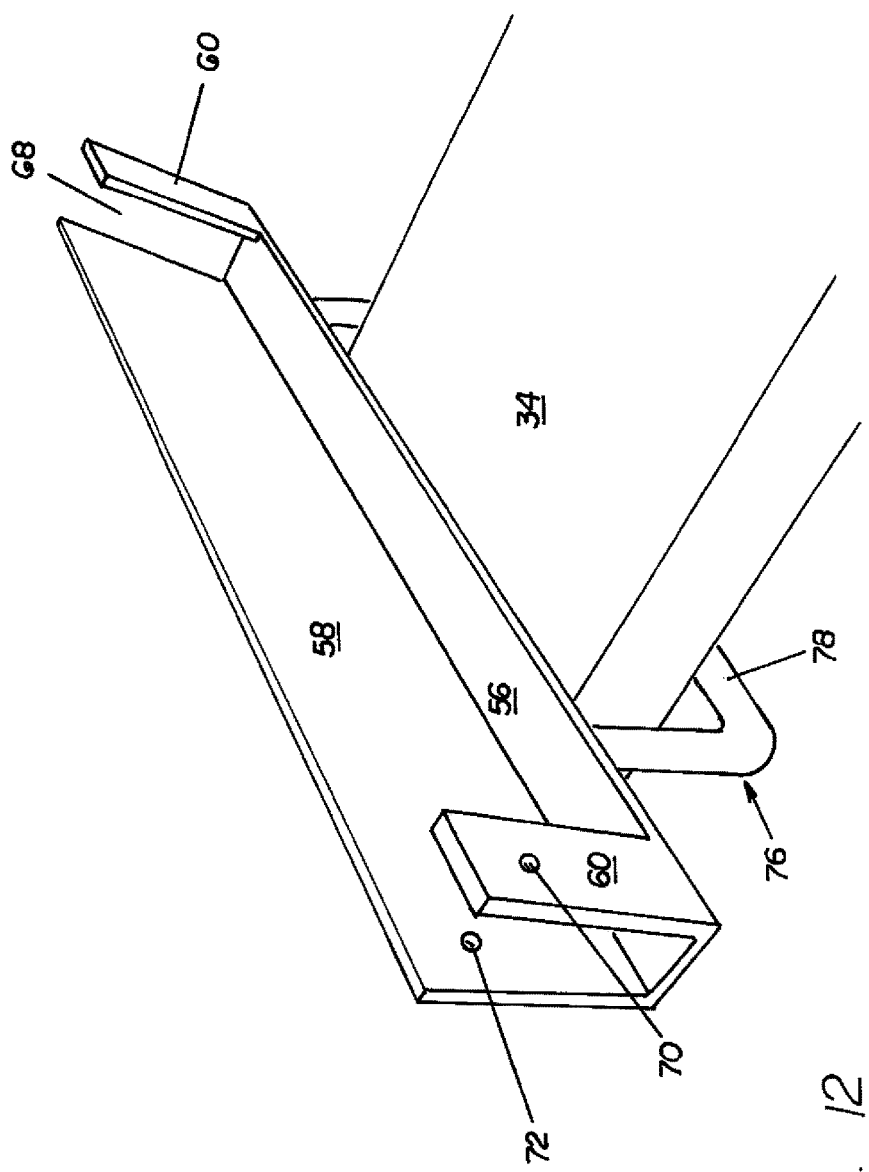
FIG. 12 is a perspective illustration of a scooter with the device installed, the scooter being in an open position ready for use, the device installed on scooter with a U-Bolt and two nuts.

The device of the present invention preferably includes holes or slots in the base plate. These holes or slots are used to fasten the device to the scooter utilizing a number of different methods including, but not limited to, a U-bolt that wraps around the body of the scooter (FIG. 12), a strap or multiple straps that wrap around the scooter body to secure the device to the scooter, and screws that secure the device directly to the scooter deck.

Figure 5:
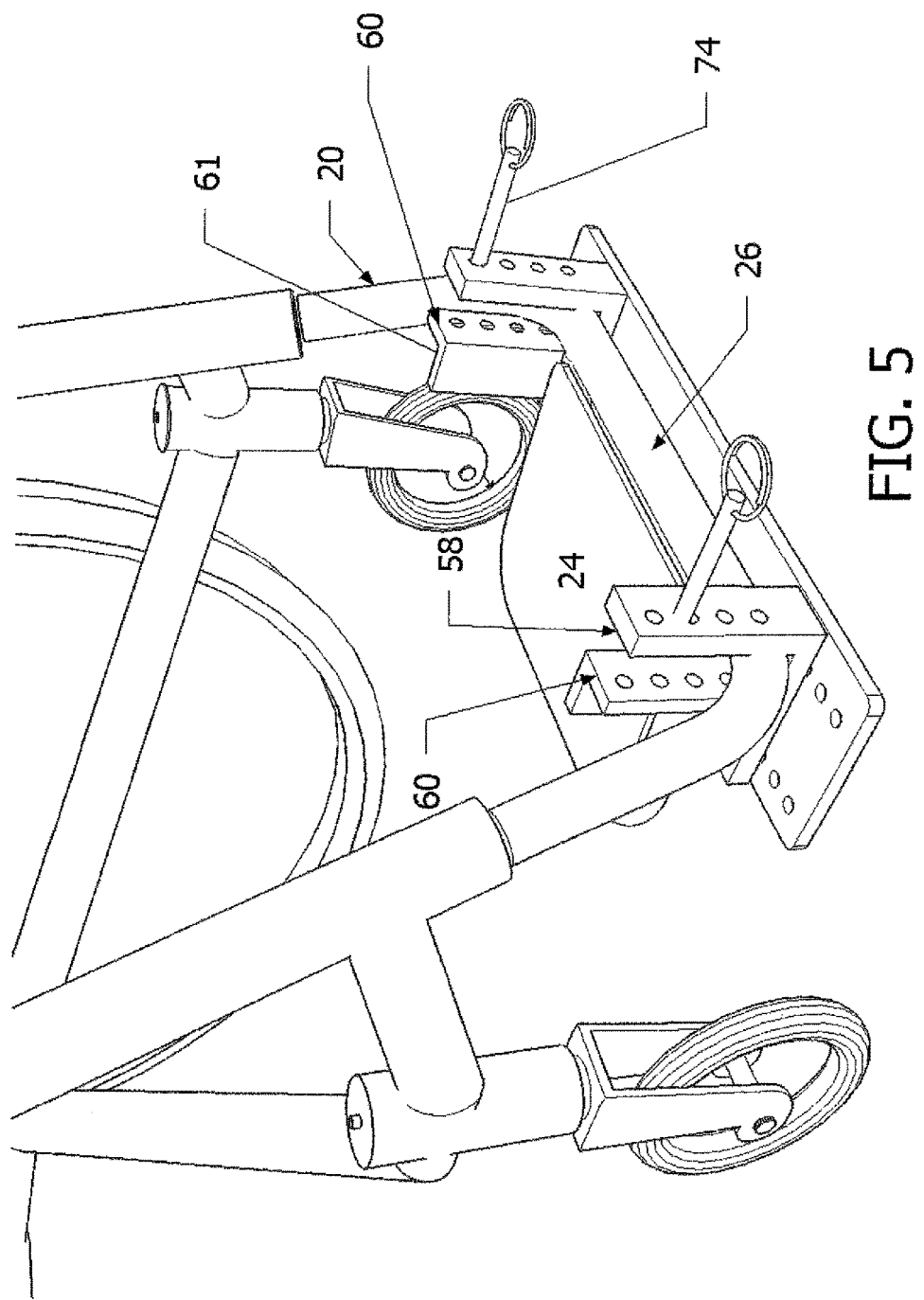
Figure 6:
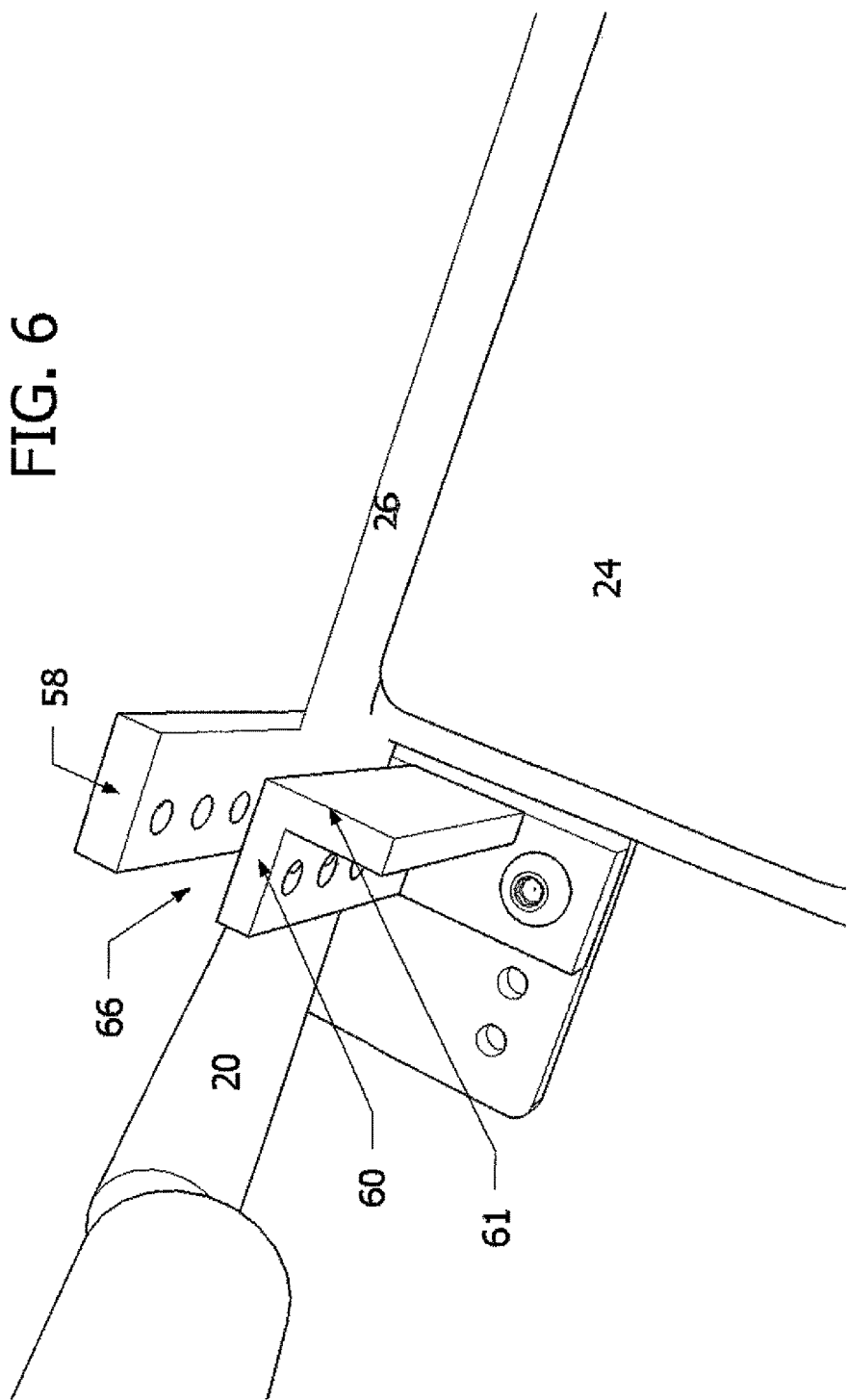
FIG. 6 is an enlarged perspective view of the device with a wheelchair foot support.

After the device is installed on the scooter, the device connects the scooter to the wheelchair via the rigid foot support of the wheelchair. The two laterally spaced running channels of the device 'guide' the wheelchair foot support into the proper position on the scooter. This includes the correct lateral position of the wheelchair on the scooter, laterally centered, as well as positioning the wheelchair square with the scooter (FIG. 5). The wheelchair foot support needs to fit snugly into the device laterally between the left and right channels, while the foot support needs to fit snugly inside the two channels. This accomplishes the squaring and lateral positioning described above. Since rigid wheelchair foot supports are not all the same width, the device needs to be fabricated according to the width of the foot support. The majority of rigid wheelchair foot supports are one of five widths. Therefore, fabricating the device in five different sizes would cover most foot support widths.

The left and right laterally running channels of the device receive the horizontal wheelchair bar of the foot support and 'hold' the horizontal bar of the foot support thereby transferring the pulling and braking force of the scooter to the wheelchair (FIG. 5). The channels have holes to accommodate two horizontal, longitudinally oriented pins. When the wheelchair foot support bar is in the proper position inside the channels, two pins or fastening devices can be pushed through the holes, over the wheelchair bars, effectively preventing vertical movement of the wheelchair relative to the scooter deck.

Figure 13:
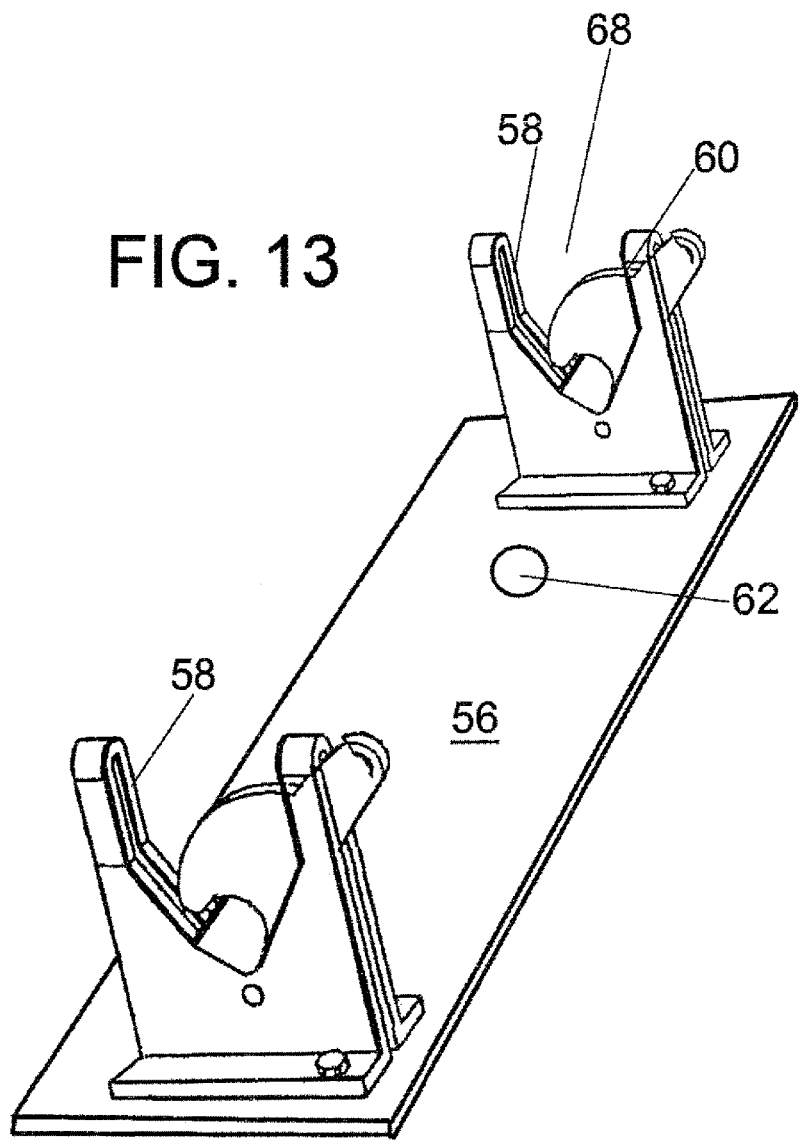
FIG. 13 is a perspective illustration of a device with automatic coupling latches eliminating the need for pins.

To use the device of the present invention requires installation on the scooter. This is accomplished utilizing one of the three methods below:

A) Place the device on the scooter. Wrap the U-bolt around the underside of the scooter deck and up through the two holes in the device. Next, thread the two nuts onto the U-bolts, making sure that the device is square with the scooter. Tighten the nuts to secure the device to the scooter (FIG. 13).

B) Place the device on the scooter. Wrap the strap/straps around the scooter deck and through the slot/slots in the device. Position and square the device on the scooter. Tighten the strap/straps.

C) After positioning and squaring the device on the scooter, use several screws to fasten the device directly to the scooter deck, taking caution not to damage any vital components of the scooter (i.e. battery).

Methods A) and B) above are preferred because no holes are required to be made in the scooter. Once the device is installed on the scooter, it is intended that the device remain installed onto the scooter. Having the device installed onto the scooter does not hinder the folding of the scooter (FIG. 11) nor the use of the scooter by an able-bodied person in the standing position (FIG. 10).

To use the device of the present invention requires the user to 'mount' the scooter while seated in his wheelchair. This is accomplished utilizing the sequential steps as follows:

A) Approach the scooter in his/her wheelchair from the rear of the scooter.

Figure 14:
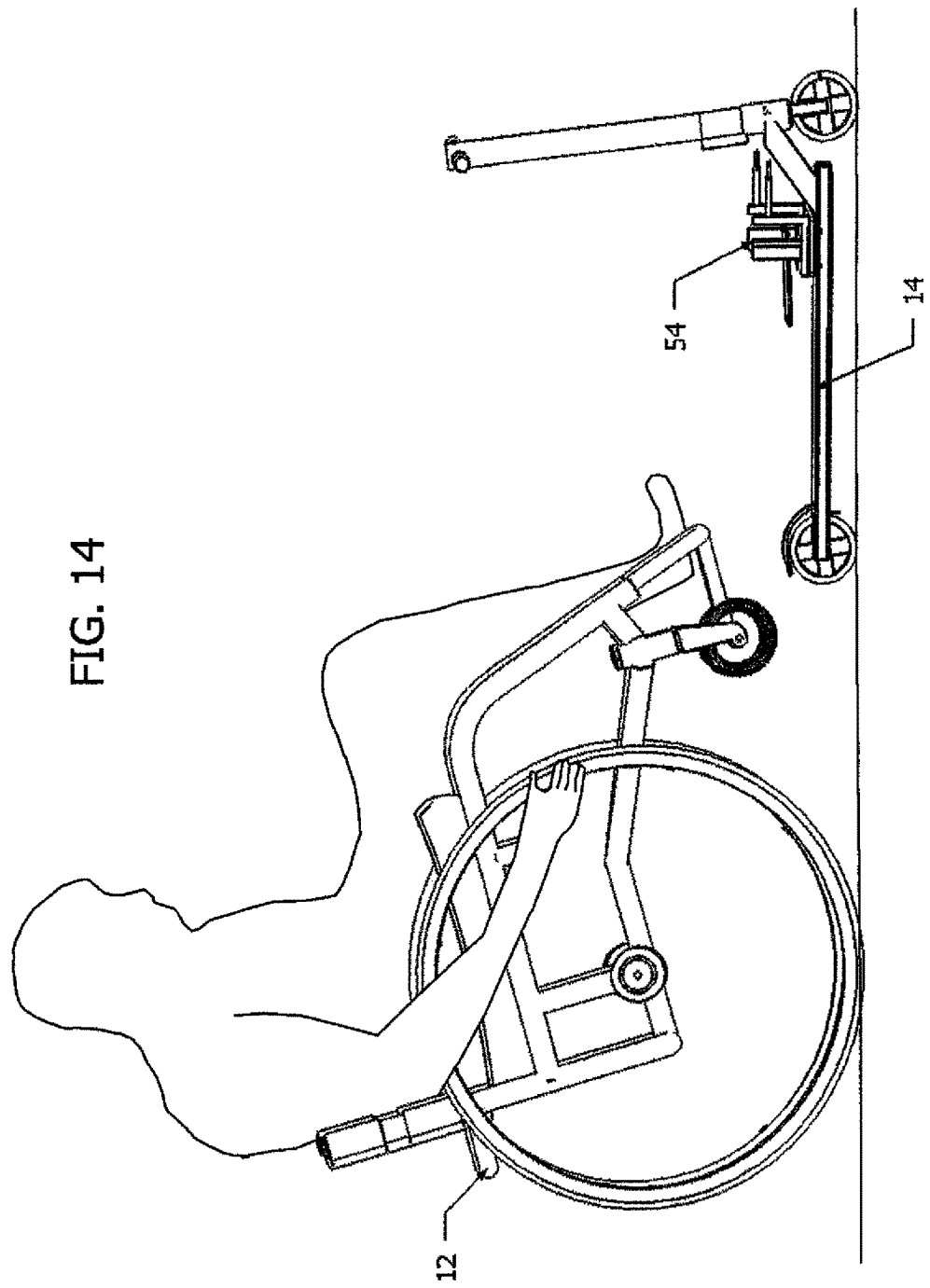
FIG. 14 is a perspective illustration of a user at the rear of the scooter while popping a wheelie, the device already installed on the scooter.

B) Then the user needs to 'pop a wheelie' with his wheelchair, high enough so that the wheelchair foot support clears the rear of the scooter (FIG. 14).

Figure 15:
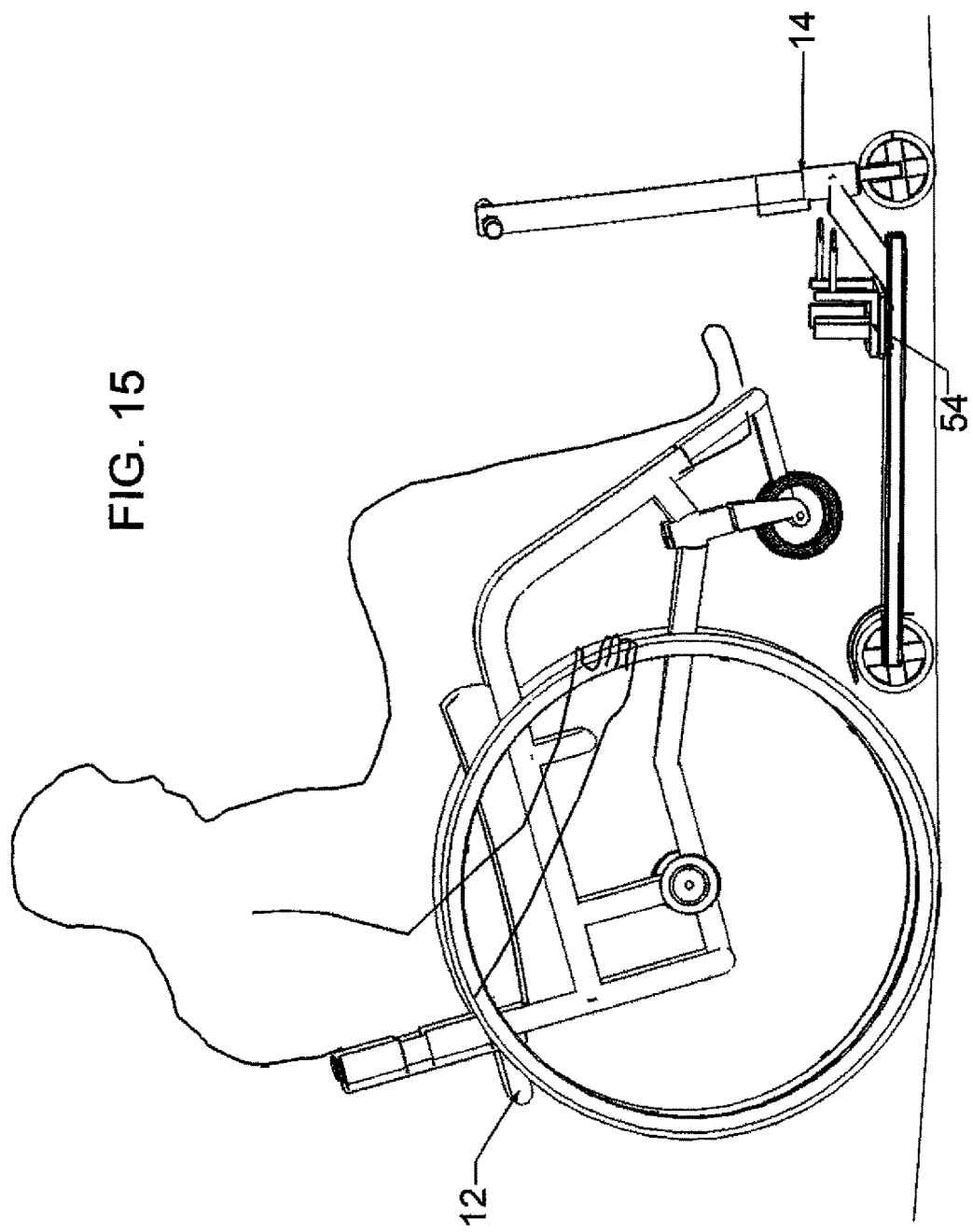
FIG. 15 is a perspective illustration of a user moving forward over the scooter while in the wheelie position.
Figure 16:
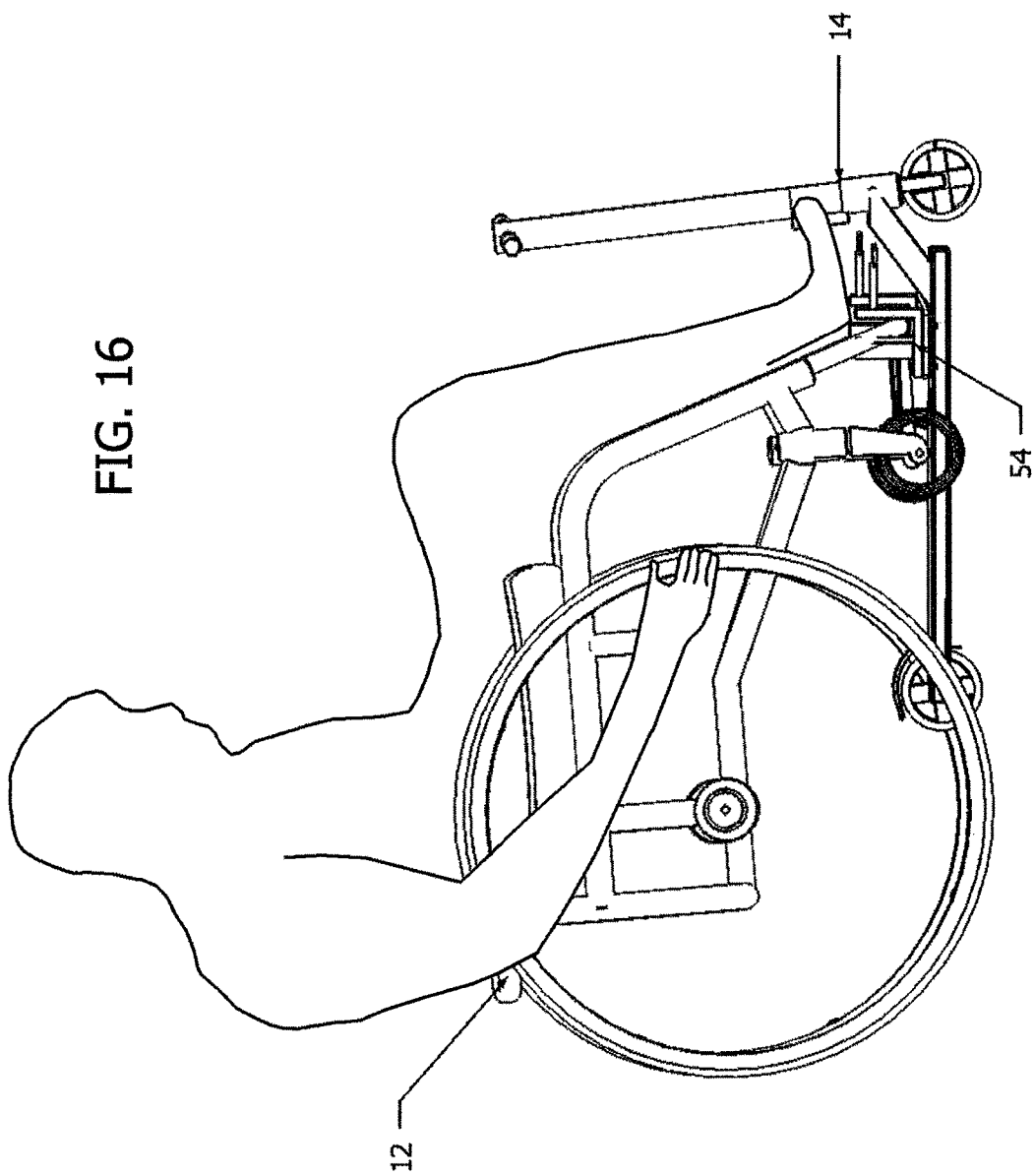
FIG. 16 is a perspective illustration of a user lining up the foot support of the wheelchair over the device.

C) The user next moves forward with his/her wheelchair in the popped position over the rear of the scooter (FIG. 15) and forward enough such that the foot support is approximately over the device (FIG. 16).

D) Next, the user allows the wheelchair foot support bar to drop into the device. The channels of the device guide the wheelchair foot support and foot support bar into proper position as it drops down.

E) After dropping the foot support bar into the channels, the user then needs to slide the two pins through holes in the channels over the wheelchair foot support bars. The two pins secure the foot support bar in place vertically and prevent rolling of the wheelchair relative to the scooter about a longitudinal axis.

The scooter is now ready to use (FIG. 17). With some practice, this entire final step, including securing the pins over the foot support bar can be accomplished independently by an active wheelchair user in less than 5 seconds. Some wheelchair users will require assistance to pop a wheelie over the rear of the scooter and/or to slide the two pins through the holes.

Another version of this device utilizes a spring loaded latch, similar to a gate latch. Note FIG. 13. The latch automatically clasps the horizontal bar of the foot support upon contact. With this version, there is no need to utilize the two pins that secure the foot support bar down.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bracket system for coupling any non-motorized wheelchair to a scooter comprising:
   a base plate having two spaced larger holes and spaced smaller holes;
   two L-shaped components composed of an upstanding vertical plate and a lower horizontal plate, a vertical aperture extending through each lower plate, two upstanding rearward plates attached to an associated lower plate, pairs of axially aligned, elevationally spaced horizontal apertures extending through an associated vertical plate and rearward plate;
   two spaces formed between the rearward plates and the vertical plates constituting a left and right channel;
   lock pins extending through associated pairs of horizontal apertures of the upper and rearward plates;
   a U-bolt having a central section and upstanding threaded ends extending upwardly through the larger holes in the base plate; and
   a nut threadedly coupled to each threaded end.

2. The system as set forth in claim 1 and further including:
   a motorized scooter with a support deck receiving and supporting the base plate.

3. The system as set forth in claim 2 and further including:
   a non-motorized wheel chair with a wheelchair foot support transverse bar received between the left and right channels beneath the lock pins.

4. A wheelchair/scooter system (100) including a bracket (110) for operatively coupling any non-motorized wheelchair (12) to a motorized scooter (14) for creating a motorized wheelchair, the coupling and the creating being done in a safe, convenient, and economical manner, the system comprising, in combination:
   a base plate (114) configured in a rectangular configuration and positioned in a horizontal plane, the base plate having two laterally spaced larger holes (116), the laterally spaced larger holes being spaced by a distance greater than a width of a support deck of a motorized scooter to which the bracket is to be coupled, the base plate extending transversely across and beyond an entire width of the support deck, the base plate formed with a plurality of pairs of spaced smaller holes (118);

two L-shaped components (122), each L-shaped component composed of an upstanding vertical plate (124) and a horizontal lower plate (126), a pair of latitudinally spaced vertical apertures (128) extending through each lower plate, a bolt (130) extending through the vertical apertures in the lower plate and the smaller holes of the base plate with a nut (120) securing each bolt in place, extending through each lower plate, two upstanding rearward plates (132), each upstanding rearward plate attached to an intermediate extent of an associated lower plate, two sidewalls (134), each side wall having edges attached to an associated rearward plate and an associated lower plate, the sidewalls being vertically disposed in facing relationship with each other, a plurality of pairs of axially aligned, elevationally spaced horizontal apertures (136), each pair of axially aligned horizontal apertures extending through an associated vertical plate and an associated rearward plate;

two spaces formed between the rearward plates and the vertical plate constituting a left channel (138) and a right channel (140), two pairs of axially aligned horizontal apertures being in a horizontal plane spaced above the base plate by a distance greater than a diameter of a wheelchair foot support wheelchair foot support transverse bar of a wheelchair to be coupled to the bracket;

removable lock pins (144) extending through associated pairs of axially aligned horizontal apertures of the vertical plates and the rearward plates;

a U-bolt (148) having a central section (150) beneath the support deck, the U-bolt having upstanding threaded ends (152) extending upwardly through the laterally spaced holes in the base plate; and nuts (156) threadedly coupled to each threaded end of the U-bolt to hold the base plate to the support deck.

\* \* \* \* \*